Aug. 16, 1927.
J. A. CAMPO
1,639,211
NUT LOCK
Filed Oct. 22, 1926
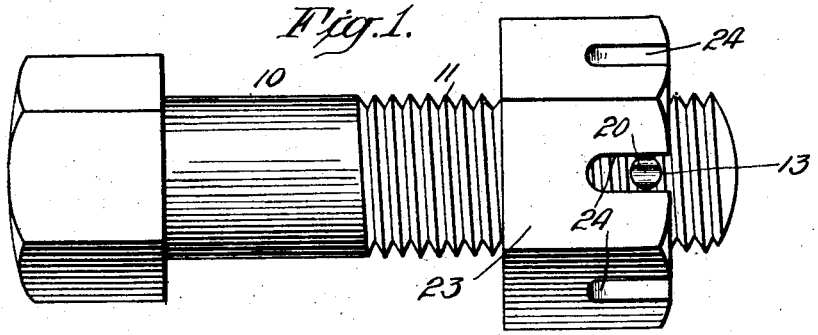
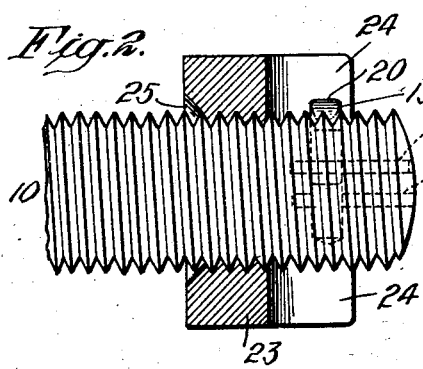
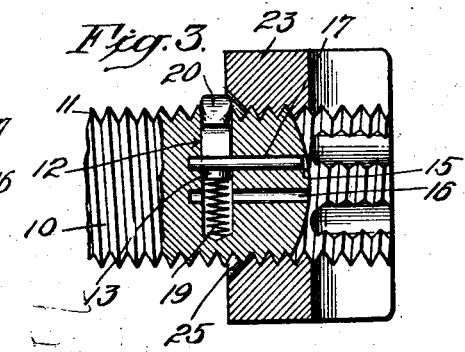
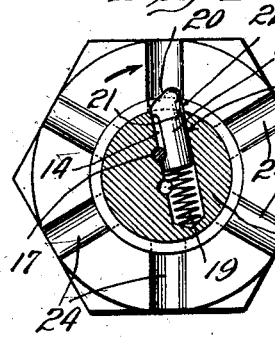
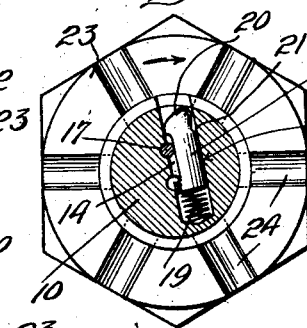
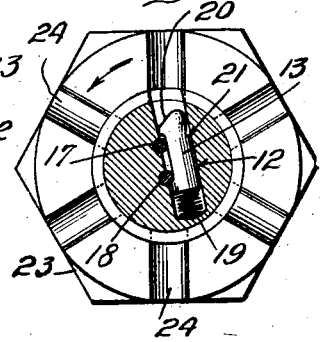
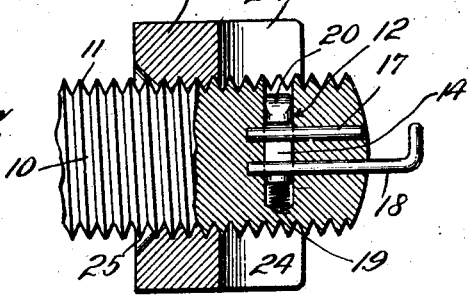
INVENTOR
JAMES A. CAMPO
BY Geo. S. Wheelock
ATTORNEY Patented Aug. 16, 1927.

1,639,211

UNITED STATES PATENT OFFICE.

JAMES A. CAMPO, OF WOODRIDGE, NEW JERSEY.

NUT LOCK.

Application filed October 22, 1926. Serial No. 143,432.

This invention relates to nut locks of the type having spring actuated locking pins carried by the bolt for engaging in recesses of the nut.

The objects of the present invention are to provide a castellated nut having a taper at the end of its screw threaded hole, formed by preferably chamfering the nut, and to provide a specially constructed spring-actuated locking pin which is adapted to securely lock the nut on the bolt, such pin being preferably provided with means for holding the locking pin in retracted position.

Other objects of the invention are to provide efficient and simple means for securely locking the nut in position on the bolt, which device at the same time will be comparatively inexpensive.

These being among the objects of the present invention, the same consists of certain features of construction and combinations of parts to be hereinafter described and then claimed with reference to the accompanying drawings illustrating a preferred embodiment of the invention, in which:

Fig. 1 is a side elevation of a bolt and nut with the present improvements applied;

Fig. 2 is an elevation of a portion of the screw threaded end of the bolt, the nut being shown thereon in section and locked in position;

Fig. 3 is a longitudinal section of the bolt and a transverse section of the nut, including the present improvements, the nut being shown as about to be screwed onto the bolt;

Fig. 4 is a transverse section of the bolt with the nut thereon in locked position;

Fig. 5 is a transverse section of the bolt showing the manner in which the locking pin is depressed by the turning of the nut;

Fig. 6 is a similar section showing the locking pin held in retracted position so that the nut can freely screw off from the bolt; and Fig. 7 is a section of the bolt and nut which is at right angles to the section, Fig. 6.

Referring to Figs. 1 to 5 inclusive the bolt 10 is provided with a screw threaded portion 11 having a bore 12 transverse thereof. The bore 12 extends tangentially to the longitudinal axis of the bolt so that the locking pin 13 will be guided at an inclination to said axis.

Locking pin 13 is provided with a longitudinal recess 14 preferably formed by cutting away one side of the locking pin as shown clearly in Fig. 4. Holes 15, 16 are formed longitudinally in the end of the screw threaded portion of the bolt and these are in a plane substantially parallel with the plane in which the locking pin 13 is adapted to move, and said holes intersect the bore 12 in the bolt. Inserted in the hole 15 preferably with a friction tight fit is a limit pin 17 which passes through the recess 14 in the locking pin so that by contact of the end walls or shoulders of the recess 14 with said pin 17, the locking pin 13 will be limited as to the extent of its projection from the bolt and its retraction into the bolt.

A hold-back pin 18 is provided which is adapted to be inserted into the hole 16 in the bolt when the locking pin 13 is fully retracted and its spring 19 placed under compression. In this retracted position of the locking pin 13, the hold-back pin 18 maintains the locking pin retracted, as shown in Figs. 6 and 7.

The locking pin 13 is beveled at its outer end to provide a surface 20 which is preferably inclined away from the recess 14 in said pin. Preferably at that side of the locking pin 13 which is opposite to the recess 14, there is formed a shoulder 21 produced by notching the pin at that side, and in any event it is preferred that the end surface 20 of the locking pin be inclined toward said shoulder 21. The shoulder 21 is about directly opposite the inner terminal of the inclined surface 20. That portion of the screw thread of the nut which is adjacent the shoulder 21 provides a stop 22 against which the shoulder 21 on the locking pin is adapted to abut when the said pin is projected by its spring, so that the locking pin, in addition to the stopping means furnished by the limit pin 17 is provided at its opposite side with additional stopping means.

The nut 23 is preferably castellated by providing in its outer part a series of notches or recesses 24 and at its inner part a taper 25 formed by chamfering the screw threaded bore of the nut at that end which is first engaged with the bolt. When the nut is screwed to the right upon the screw threaded portion 11 of the bolt, the taper 25 will first come in contact with the projecting inclined end of the locking pin, as shown in Fig. 3, and said pin will be successively projected and retracted as shown in Figs. 4 and 5 when the nut is about to be screwed home. The nut will by means of its castellations successively allow the locking pin to be projected and then retracted, first by contact with the inclined end surface 20, and the locking pin will be held retracted by the threaded portions of the nut which are between the notches 24 until the locking pin comes to another notch. When the nut has been screwed home, the projecting end of the locking pin will preclude the turning of the nut off from the bolt. If the shoulder 21 and thread 22 do not preclude the locking pin 13 from being lost, when and if the limit pin 17 might have fallen out, it will be prevented by reason of the fact that the bore 12 in the bolt is at an inclination to the notch 24 of the nut in which the locking pin is engaged. It will be seen that the beveled end of the locking pin 13 would in that case find an abutment against the adjacent side of the bore 12.

If it be desired to remove the nut, the locking pin 13 is caused to be pushed into the bolt by a slight turn of the nut and then the hold-back pin 18 is inserted into the hole 16 in the bolt, as shown in Figs. 6 and 7, so as to maintain the locking pin retracted, or, without trying to turn the nut further home so as to push in the locking pin, the latter may be retracted by inserting a nail or the like through the notch 24 in the nut into which the locking pin is engaged, and then the latter may be pushed back far enough so that the hold-back pin 18 may be utilized. In either case the nut 23 may then be turned off from the bolt so as to release the parts held by the bolt and nut.

What I claim, is:

1. In a nut lock, a screw-bolt having a transverse bore, a spring-actuated locking pin longitudinally movable in said bore and provided with two shoulders, and limit means inserted longitudinally in the bolt for restricting the movements of the pin, the bolt having a hole at its threaded end which is substantially parallel with the limit means, for receiving a removable hold-back pin and spaced away from the limit means for a distance slightly less than the distance between the shoulders.

2. In a nut lock, a screw-bolt having a transverse bore tangential to the longitudinal axis of the bolt, whereby the bore is located nearer one side of the bolt than the other, a spring-actuated locking pin longitudinally movable in said bore and provided with a longitudinal recess, and a limit pin fixed in the bolt for restricting the movements of the pin, the bolt having a hole at its threaded end for receiving a removable hold-back pin and spaced away from the limit pin for a distance slightly less than the length of the longitudinal recess in the locking pin, and the outer end of the locking pin having a side shoulder toward the specified side of the bolt and also having a terminal beveled surface inclined toward the shoulder.

3. In a nut lock, in combination, an internally threaded nut provided with peripheral recesses, a screw-bolt having a transverse bore, a spring-actuated locking pin longitudinally movable in said bore and provided with a longitudinal recess, and limit means in the bolt for restricting the movements of the pin, the bolt having a hole at its threaded end for receiving a removable hold-back pin and spaced away from the limit means for a distance slightly less than the length of the longitudinal recess in the locking pin, whereby said nut may be turned onto the bolt to depress the locking pin step by step by engagement with its outer end.

4. In a nut lock, in combination, an internally threaded nut provided with peripheral recesses, a screw-bolt having a transverse bore tangential to the longitudinal axis of the bolt, a spring-actuated locking pin longitudinally movable in said bore and provided with a longitudinal recess, and a limit pin fixed in the bolt for restricting the movements of the pin, the bolt having a hole at its threaded end for receiving a removable hold-back pin and spaced away from the limit pin for a distance slightly less than the length of the longitudinal recess in the locking pin, and the outer end of the locking pin having a side shoulder and a terminal beveled surface inclined toward the shoulder, the thread of said bolt at its said bore providing a stop for said shoulder on the nut, and the nut being turnable on the bolt to bear on said beveled surface, whereby the nut may act on the beveled end of the locking pin to depress it for step by step engagement with the recesses in the nut.

5. In a nut lock, a screw-bolt having a transverse bore, a spring-actuated locking pin longitudinally movable in said bore and provided with a longitudinal recess, the threaded end of said bolt having two, spaced, longitudinal holes in the plane of said recess, a limit pin inserted in one of the holes for restricting the movements of the pin, and a removable hold-back pin insertable in the other hole for maintaining the pin in retracted position.

6. In a nut lock, a screw-bolt having a transverse bore, a spring-actuated locking pin longitudinally movable in said bore and provided with a longitudinal recess, and limit means in the bolt for restricting the movements of the pin, the bolt having a hole at its threaded end for receiving a romovable hold-back pin and spaced away from the limit means for a distance slightly less than the length of the longitudinal recess in the locking pin, in combination with an internally threaded nut having recesses for engagement by the locking pin, the nut having a chamfered surface adapted to bear on the locking pin to gradually push it back into the bore.

JAMES A. CAMPO.